United States Patent Office 2,801,224
Patented July 30, 1957

2,801,224

QUATERNARY AMMONIUM ANION EXCHANGE RESINS AND METHOD FOR PREPARING THE SAME

Albert H. Greer, Westmont, N. J., assignor to The Permutit Company, New York, N. Y., a corporation of Delaware No Drawing. Application March 30, 1953,
Serial No. 345,680

17 Claims. (Cl. 260—2.1)

The present application is a continuation-in-part of my copending application, Serial Number 304,009, filed August 12, 1952.

The present invention relates to novel, synthetic polymeric compositions which are useful in the removal of anions from aqueous solutions and to a novel method for preparing said compositions. The invention also relates to a method of removing anions from an aqueous solution.

Anion exchange resins, in order to be satisfactory for use, must be substantially insoluble in water, dilute acids and alkalies. They must be capable of resisting physical transformation, such as undue swelling, or mechanical disintegration, such as spalling or shattering of the resin beads and granules, when in contact with the solution they are used to deionize. They must also have a high useful or operating capacity for removing anions from aqueous solutions, and be capable of being repeatedly regenerated for reuse when they become exhausted. It is also desirable that in addition to a high operating capacity, the resin have a high capacity for removing the weaker anions from solution, such as silica and carbon dioxide.

It is an object of the present invention to provide a novel anion exchange resin which, while possessing all of the essential properties of a successful anion exchange resin, possesses an unusually high operating capacity and particularly a high capacity for the removal of weaker anions from aqueous solutions.

It is a further object to provide a novel process for the removal of anions, and especially weaker anions, from aqueous solutions.

It is an additional object to provide a novel process for producing the novel anion exchange resins of the present invention.

Other objects will be apparent to those skilled in the art from a reading of the descriptions which follows.

My invention comprises, in part, novel, synthetic polymeric anion exchange resins containing one and preferably two or more (di and poly) quaternary ammonium substituents per molecular unit of polymeric resin. The polymeric resin moiety of the anion exchanger shall be a copolymer of a vinyl substituted, cyclic compound having an active hydrogen substituent and having a ring activating substituent and an unsaturated crosslinking compound. The activated nucleus shall be suitably substituted with at least one quaternary ammonium group and shall desirably contain two or more quaternary ammonium groups. Preferably, the quaternary ammonium groups shall be alkyl or alkyl-alkanol substituted quaternary ammonium groups.

The vinyl substituted, cyclic compound, which forms part of the anion exchange resin, and which contains an active hydrogen substituent, shall be one containing one or more hydrogen atoms which are made reactive by the effect of another substituent of the cyclic nucleus which activates the ring, such as a hydroxyl group; to produce a vinyl substituted phenol, a hydroquinone group; to produce vinyl substituted benzohydroquinones or naphthohydroquinones; such compounds as vinyl cyclohexanone, vinyl cyclopentanone, vinyl antipyrine, vinyl methyl thiophene and vinyl methyl furan; or preferably a vinyl substituted, alkyl substituted, heterocyclic compound which is activated by the presence of a nitrogen atom in the aromatic ring. In each of these compounds there is a group substituted upon or an atom which is part of the cyclic nucleus which activates the ring and consequently activates one or more hydrogen containing substituents of the same ring. Thus the hydroxyl group activates the ring of the phenol group, the hydroquinone group activates a ring of benzohydroquinone and naphthohydroquinone compounds, the ketone group activates the cyclohexane and cyclopentane rings and the sulfur, oxygen and nitrogen atoms in the heterocyclic nuclei activate the heterocyclic nuclei of thiophene, furan and pyridine containing compounds.

The preferred vinyl substituted, nitrogen-containing heterocyclic compounds are those of the alkyl pyridines, preferably methyl pyridine. However, other vinyl substituted, nitrogen containing heterocyclic compounds may be used, such as the alkyl substituted, and preferably the methyl substituted, vinyl pyrroles, pyrimidines, pyridazines, pyrazines, quinolines and isoquinolines.

Among the specific vinyl derivatives of alkyl substituted, nitrogen containing heterocyclic compounds contemplated, are the vinyl methyl pyridines in which the methyl group is substituted in the 2, 4 or 6 positions. These include 2-methyl-5-vinyl pyridine, 4-methyl-5-vinyl pyridine and 2,4-dimethyl-5-vinyl pyridine. Other compounds are: the vinyl methyl quinolines such as 2-methyl-5-vinyl quinoline, 4-methyl-5-vinyl quinoline, the isoquinolines, such as 1-methyl- or 3-methyl-5-vinyl isoquinoline. Based upon experience to date, 2-methyl-5-vinyl pyridine is preferred.

The other component of the copolymer is an unsaturated crosslinking compound. This is a well defined type of compound having the faculty of polymerizing with vinyl substituted compounds to form an insoluble resin. They may be polyvinyl aromatic or aliphatic unsaturated compounds. The most important type of crosslinkers are the polyvinylaryl compounds, such as the divinyl and other polyvinyl benzenes, including trivinyl and tetravinyl benzenes, divinyl toluenes and alkylbenzenes, xylenes, naphthylenes and diphenyls. Other crosslinking compounds which may be used advantageously are unsaturated aliphatic compounds containing two unsaturated groups, desirably two double bonds. Examples of these are: divinyl sulfone; divinyl ketone; vinyl ethinyl hydrocarbons such as vinyl acetylene and divinyl acetylene; vinyl maleate; vinyl esters of acrylic, methacrylic and ethacrylic acids, such as vinyl acrylate, vinyl methacrylate and vinyl ethacrylate; divinyl esters of dibasic acids, such as divinyl oxylate, divinyl maleate, divinyl malonate and divinyl succinate; and acrylic diesters of an aliphatic polyhydric alcohol, such as diethylene glycol dimethacrylate, ethylene glycol dimethacrylate, diethylene glycol diacrylate, glycerine dimethacrylate and ethylene glycol diacrylate. Other unsaturated aliphatic groups than the vinyl group may be used, although the group should preferably have a terminal double bond. Among such groups which may be used to replace the vinyl group are the allyl group, the 3-n-butenyl group, etc. To date, divinylbenzene has proven the most suitable for use in the copolymer of the invention.

While, as explained above, the copolymer may be based upon any vinyl substituted, cyclic compound, having an active hydrogen substituent, for purposes of illustration one of the more specific phases of the basic anion exchange resins will be described in relation to the use of 2-methyl-5-vinyl pyridine as the basic component of the copolymer. The structure described is based on a molecular unit of 2-methyl-5-vinyl pyridine.

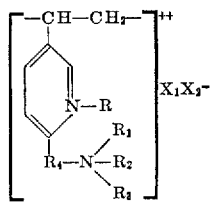

In the above formula R, R₁, R₂ and R₃ are members selected from the class consisting of alkyl, alkanol and aralkyl groups. R₄ is a lower alkylene group and preferably an ethylene group. R, R₁, R₂, and R₄ are preferably "lower" in size containing not more than 8 carbon atoms and preferably not more than 4 carbon atoms. When these groups are alkyl groups, best results are obtained when they are methyl or ethyl groups. The most suitable alkanol group is the ethanol group. X₁ and X₂ are anions and need not be identical. It is desirable that X₁ and X₂ be anions of a strong acid, such as a mineral acid. For anion exchange purposes, it is recommended that both X's be hydroxyl groups.

If the pyridine ring in the above formula contains additional alkyl substituents, these may become substituted with additional quaternary ammonium groups when the copolymer resin is subjected to the process of the invention. It is to be understood that the alkyl group initially substituted on the pyridine ring should be in the 2, 4 or 6 positions with respect to the ring nitrogen atom, and that the alkyl group preferably is a methyl group containing an active hydrogen atom, if the alkyl group is to be substituted with a quaternary ammonium group when subjected to the process to be described. If the heterocyclic ring contains a second nitrogen atom, this may additionally form another quaternary ammonium group when treated with a quaternizing agent.

It will be evident from the structure of the pyridine moiety of the copolymer that there are at least two quaternary ammonium groups per heterocyclic unit; one of which is formed in part by the nitrogen contained in the ring and another is attached to the ring through a lower alkylene group. It is for this reason that the alkyl substituted-vinyl substituted-nitrogen containing heterocyclic compounds are preferred, as the capacities of the anion exchange resin will be a function of the number of quaternary ammonium groups.

While a definite structure has been assigned to the anion exchange resin illustrated by the above structural formula, this is done for purposes of illustration only. The structure of the anion exchange resin is not to be restricted by any theory of reaction mechanism for the novel process which comprises part of the invention. While the structure assigned for the product is based upon the most recently available scientific information, it is possible that a different structural relationship may exist, but should this be true, the composition will still be composed of the same essential chemical constituents described. In a manner of speaking, the highly basic anion exchange resins of the invention may be said to comprise those products produced by the novel process of the invention. Thus a copolymer obtained from a vinyl substituted cyclic compound having at least one substitutent hydrogen atom of pronounced reactivity which is capable of condensation with ammonia, or a primary or secondary amine or the hydrohalide salts of these amines and a lower aldehyde is satisfactory for use in the process of the invention, and it is the resulting anion exchange resins which are the subject of the present invention.

The preferred polymerizate is that prepared by copolymerizing a vinyl-alkyl-pyridine, and suitably 2-methyl-5-vinyl-pyridine, and divinyl benzene; the latter serving as the crosslinker. It is preferred that the vinyl-alkyl-pyridine constitute from 60.0 to 99.9%, on a molar basis, of the polymerizate and that the crosslinker constitute 0.1 to 40.0% of the polymerized mixture, on a molar basis. Best results are obtained when the alkyl-vinyl-pyridine constitutes 85.0 to 99.5% of the polymerizate and the crosslinker from 0.5 to 15.0% (both on a weight basis). The optimum composition of the polymerizate is one prepared from 10% by weight of crosslinker and 90% by weight of the alkyl-vinyl-pyridine. A polymerizate having a particle size range of between 16 to 50 mesh is most desired.

The present invention also comprises the novel process for preparing the novel anion exchange resins of the invention. In preparing my anion exchange resins, I first prepare the copolymer resin. The copolymer resin is then subjected to the process of the invention which comprises condensing the copolymer resin with a lower aldehyde containing not more than three carbon atoms and a member selected from the class consisting of ammonia and primary and secondary amines. The essential feature of this process is the replacement of an active hydrogen atom contained in the copolymer resin by an amino-alkyl or substituted amino-alkyl group. If the condensation is effected with a primary amine, or its salt, the product is a secondary amine and similarly if a secondary amine is used in the condensation, a tertiary amine is produced. The use of ammonia results in a primary amine. Since the final product is desirably a quaternary ammonium salt, it is preferable to use a secondary amine in the condensation because of the smaller amount of the comparatively expensive quaternizing agent required to convert the amine to the quarternary form. After the condensation has been completed, the resultant amine is converted to the corresponding quaternary ammonium salt by treatment with a quaternizing agent.

Optionally, one may quaternize the nitrogen atom of a heterocyclic ring prior to the condensation step as well as subsequent to condensation. In particular, if the copolymer of 2-methyl-5-vinyl pyridine and divinyl benzene is treated with a quaternizing agent, the resulting quaternary ammonium polymer is then treated with a secondary amine and formaldehyde and the resulting quaternary, tertiary amine is treated with a quaternizing agent, there is produced the di-quaternary ammonium derivative.

The copolymer resin is prepared by reacting the vinyl substituted, cyclic compound, which contains an active hydrogen substitutent and having a ring activating substituent, with the crosslinking compound in the presence of an oxidizing catalyst such as oxygen, azobisisobutyronitrile, organic peroxides, such as benzoyl peroxide, lauroyl peroxide, tertiary alkyl peroxides, di(tertiary alkyl) peroxides, and persalts, such as potassium persulfate, etc. The catalyst may be used in varying amounts and desirably from 0.01 to about 5 parts per 100 parts of total monomer. The polymerization may be conducted in an aqueous emulsion or in an inert organic solvent.

The condensation step is conducted upon the copolymer resin by reacting it with a lower aldehyde containing not more than 3 carbon atoms in conjunction with ammonia or a primary or secondary amine. The preferred aldehyde is formaldehyde and its commercially available forms, such as formalin and para-formaldehyde. Other aldehydes which may be used are acetaldehyde and propylaldehyde.

Among the amine which may be used in the condensation step are the secondary amines, including the lower dialkyl amines, such as dimethylamine, diethylamine, dipropylamine and di-n-butylamine; the lower alkanol amines such as methyl ethanol amine, ethyl ethanol amine, and diethanolamine; the aralkylamines such as dibenzylamine, methylaniline; and the cyclic amines such as piperazine, piperidine and morpholine. Additionally, the corresponding primary amines of those mentioned may be used in effecting the condensation. If so, additional amounts of quaternizing agent will be required to convert the resulting secondary amine into a quaternary ammonia salt. The acid addition salts of the above amines may also be used, and among these are the hydrochlorides, hydrosulfates, etc. Also, ammonia may be used; however, this is not preferred.

The amine derivative resulting from the condensation process, as well as any nitrogen contained in a heterocyclic ring, may be converted to the corresponding quaternary ammonia groups by treatment with a quaternizing agent. Among this well known group of chemical reagents are the alkyl halides, such as methyl chloride, bromide and iodide, ethyl chloride, bromide and iodide, etc.; dialkyl sulfates, such as dimethyl, diethyl, dipropyl, dibutyl sulfates; epihalohydrins, such as epichlorohydrin; and alkyl esters of aryl sulfonates, such as methyl toluene sulfonate and methyl benzene sulfonate.

The invention also comprises the novel process for removing anions from an aqueous solution, comprising contacting the solution with the quaternary ammonium derivative of the copolymerizates of the invention. The quaternary ammonium derivates of the copolymerizates are present in sufficient quantity to remove substantially all the anions from aqueous solution. This may be done by passing the solution through a column packed with the anion exchange resin. The anion may be removed satisfactorily from the resin and the resin thus regenerated by washing it with a dilute alkali, preferably sodium hydroxide, which alkali will form a soluble salt with the adsorbed anions.

In order to disclose more clearly the nature of the present invention, specific examples illustrating the preparation of typical compounds will hereinafter be described. This is done solely by way of example and is intended neither to delineate the scope of the invention nor limit the ambit of the appended claims.

EXAMPLE 1

A. *Preparation of copolymer resin*

A copolymer resin was prepared which consisted of a 7% crosslinker in the following manner: To about 900 ml. of water heated to 50–80° C. was added a mixture of 261.3 g. of 2-methyl-5-vinyl pyridine, 38.7 g. of divinylbenzene solution containing 54.8% strength divinyl benzene and 45.2% strength ethyl styrene with 2.2 g. of benzoyl peroxide dissolved therein. After heating for three to six hours at 50–80° C., with stirring, the polymerization was complete. The resulting product which was in the shape of solid spheroids was washed with water and dried at 220–300° F. for three to six hours. The yield was nearly quantitative.

B. *Preparation of tertiary amino-methyl derivative of resin*

About 119 g. of the beads of copolymer resin prepared in Part A was suspended in 276 g. of a 32.6% solution of dimethylamine in water. The mixture was cooled to 15° C. and 162 g. of a 37% solution of formaldehyde in water was added with stirring at such a rate as to keep the temperature below 30° C. After addition of reagents had taken place, the suspension was heated to 50° C. and stirring continued for 6 to 8 hours. The beads were filtered from solution and washed with water and air-dried.

C. *Quaternization of tertiary amino-methyl derivative*

The entire product obtained from Part B was slurried in methanol and 300 g. of methyl iodide added at one time. The mixture was stirred and heated under reflux for 6 hours. The product was filtered, washed with methanol and then with water. The resulting resin when regenerated with 5% sodium hydroxide solution to place it in the hydroxide exchanging condition was found to have a basicity value of 17.4 kgr./cu. ft., an ultimate capacity of 27.8 kgr./cu. ft. and a density of 346 g./liter.

EXAMPLE 2

A. *Preparation of tertiary alkanolamino-methyl derivative of resin*

About 119 g. of cross-linked polymer resin prepared in Part A, Example 1, was suspended in 150 g. of methyl ethanolamine dissolved in 150 g. of water. The mixture was cooled to 15° C. and 162 g. of a 37% solution of formaldehyde in water was added with stirring at such a rate to keep the temperature below 30° C. After this addition, the mixture was heated to 50° C. and stirring continued for an additional six hours at this temperature. The product was filtered and washed with water.

B. *Quaternization of tertiary alkanol-amino-methyl derivative*

The aminated product from Part A was suspended in enough methanol to form a slurry and then 300 g. of methyl iodide was added with stirring. The mixture was heated under reflux for six hours. The product was filtered, washed with methanol and then with water. The material was regenerated with a 5% sodium hydroxide solution to convert it to the hydroxide exchanging condition and found to have a basicity value of 15.5 kgr./cu. ft., an ultimate capacity of 22.3 kgr./cu. ft., and a density of 299 g./liter.

EXAMPLE 3

A. *Preparation of tertiary amino-methyl derivative of resin*

About sixty-one grams of a 7.5% cross-linked polymer resin, prepared in the same manner as described in Part A of Example 1, was swollen in methanol for thirty minutes, filtered and placed wet in 180 g. of a 25% solution of dimethylamine in water. The mixture was cooled to 15° C. and 81 g. of a 37% solution of formaldehyde in water was added with stirring at a temperature below 30° C. After addition, the stirring was continued and the material was heated to 50° C. for 5 hours. The material was filtered, washed with water and air-dried.

B. *Quaternization of tertiary amino-methyl derivative*

The material obtained in Part A above was suspended in 100 ml. of water, 2 g. of sodium hydroxide was added and then 135 ml. of dimethylsulfate was added with stirring. An exothermic reaction occurred. After the reaction subsided, stirring was continued for six hours at 80° C. The mixture was cooled, neutralized with ammonia and filtered. The beads were washed with water, and regenerated with 5% sodium hydroxide to convert the product to the hydroxide exchanging condition. The resin had a basicity value of 16.3 kgr./cu. ft., an operating capacity of 14.2 kgr./cu. ft. [with water containing 50 p. p. m. of free mineral acids and 16 p. p. m. silica (both reported as parts of calcium carbonate)], an ultimate capacity of 24.1 kgr./cu. ft. and a density of 268 g./liter.

EXAMPLE 4

A. *Preparation of tertiary amino-methyl derivative of resin*

About sixty-one grams of a copolymer resin containing 7.5% cross-linking, prepared as described in Part A, Example 1, was suspended in 150 ml. of methanol for thirty minutes and then filtered. The wet beads were suspended in 73 g. of diethylamine and then 81 g. of a 40% solution of formaldehyde in methanol was added with stirring at a temperature below 30° C. After this addition, the mixture was heated to 60° C. for 6 hours. The beads were filtered, washed with water and air-dried.

B. *Quaternization of tertiary amino-methyl derivative*

The aminated product from the above reaction (Part A) was suspended in 100 ml. of water containing 2 g. of sodium hydroxide. Stirring was begun and 135 ml. of dimethyl sulfate was added. The temperature was slowly raised to 70° C. and held at this temperature for 6 hours.

The mixture was neutralized with ammonia and filtered. The water washed beads were regenerated with 5% sodium hydroxide to convert them to the hydroxide exchanging condition and the resin was found to have a basicity value of 18.1 kgr./cu. ft., an operating capacity of 14.5 kgr./cu. ft. [with water containing 50 p. p. m. of free mineral acids and 16 p. p. m. of silica (both reported as parts of calcium carbonate)], an ultimate capacity of 27.1 kgr./cu. ft., and a density of 280 g./liter.

EXAMPLE 5

A. *Preparation of tertiary amino-methyl derivative of resin*

About sixty-one grams of a copolymer containing 9% cross-linker prepared by the method described in Example 1, Part A, was swollen in propylene dichloride for 15 minutes, filtered and suspended in 87 g. of morpholine. Eighty-one grams of a 40% solution of formaldehyde in methanol was added during 0.5 hour at 30–40° stirring. The reaction was continued at 60° for 6 hours. The material was filtered and washed with water.

B. *Quaternization of tertiary amino-methyl derivative of resin*

The aminated product of Part A was suspended in 100 ml. water containing 2 g. of NaOH and then 100 g. of dimethyl sulfate was added with stirring. The temperature was kept at 70° C. for seven hours. The product was removed, washed with water and regenerated with 5% caustic to convert to the hydroxide exchanging condition and found to have a basicity value of 16.7 kgr./cu. ft., an operating capacity of 15.2 kgr./cu. ft. [using water containing 50 p. p. m. of free mineral acids and 16 p. p. m. of silica (both reported as parts of calcium carbonate)], an ultimate capacity of 29.4 kgr./cu. ft., and a density of 333 g./liter.

EXAMPLE 6

A. *Initial quaternization of resin*

Approximately 100 g. of a copolymer containing 7.5% cross-linking prepared by the method described in Part A, Example 1, was suspended in 250 ml. of water containing 10 g. of calcium oxide. The suspension was treated with gaseous methyl chloride for five hours at 40 p. s. i. at 50° C. The mixture was acidified with hydrochloric acid, filtered, washed and air-dried.

B. *Tertiary amino-methylization of resin followed by final quaternization*

About 86 g. of the material from Part A, which had a basicity value of 9.4 kgr./cu. ft., was suspended in propylene dichloride for thirty minutes and then filtered. The material was then suspended in 180 ml. of a 25% solution of dimethylamine in water and 81 g. of 37% solution of formaldehyde in water was added with stirring during 0.5 hour at 30° C. The mixture was then heated to 50° C. for 6 hours with stirring. The material was then filtered, washed with water and suspended in 100 ml. of water containing 2 g. of dissolved sodium hydroxide and 50 g. of dimethylsulfate was added with stirring. The mixture was heated to 70° C. for six hours. The resin was filtered from solution, washed with water and regenerated with 5% sodium hydroxide solution to convert to the hydroxide exchanging condition, and was found to have a basicity value of 16.9 kgr./cu. ft., an operating capacity of 12.2 kgr./cu. ft. [using water containing 50 p. p. m. of free mineral acids and 16 p. p. m. of silica (both reported as parts of calcium carbonate)], an ultimate capacity of 25.1 kgr./cu. ft., and a density of 304 g./liter.

EVALUATION TESTS

Certain data are given for the products prepared in the above examples which are of value in assessing the usefulness of highly basic anion exchange resins. The method used for determining those values which are not the subject of standardized tests is described below.

As used in the examples and elsewhere in this specification, the term "basicity value" (sometimes referred to as "salt-splitting capacity") is a measure of the capacity of the anion exchange resin to remove the anions of weak acids. Since the value of a highly basic anion exchange resin may often reside in its ability to remove the anions of weak acids, as well as those of strong acids, this is a critical value of the performance of any basic anion exchange resin. As expressed here, this value is obtained by passing 270 ml. of a 0.75 normal sodium hydroxide solution through a 16 mm. column containing 40 ml. of the anion exchange resin at a flow rate of approximately 5 ml. per minute. This places the anion exchange resin or polymerizate in the hydroxide exchanging condition. The resin bed is rinsed as free as possible of phenolphthalein alkalinity with distilled water. 750 ml. of 0.5 normal sodium chloride solution is next passed through the resin bed at a flow rate of 7.5 ml. per minute. The column is washed with distilled water. The effluent and washings from the sodium chloride treatment are collected, mixed and titrated with 0.02 normal sulfuric acid solution to a methyl orange endpoint. Since the strongly basic anion exchange resin will remove chloride ion from the sodium chloride solution and convert sodium chloride to sodium hydroxide, this determination permits the calculation of the sodium chloride converted to sodium hydroxide giving the "basicity value" capacity of the anion exchange resin. This sodium chloride splitting value is expressed in kilograins of calcium carbonate per cubic foot of anion exchange resin. Resins having a high "basicity value" will have a high capacity for the removal of weak acids, such as silicic acid and carbonic acid from solutions.

The term "ultimate capacity" used in the examples and elsewhere in the specification is determined by placing 40 ml. of resin, which has first been placed in the chloride form by passing an excess solution of dilute hydrochloric acid over the resin followed by washing with water, in a column of 16 mm. size and through this column is passed 1000 ml. of 0.75 normal sodium hydroxide at the rate of 5 ml./min. The resin bed is then washed free of phenolphthalein alkalinity with distilled water. Next 800 ml. of 0.25 normal hydrochloric sulfuric acid solution (a ratio of 1.5 parts of hydrochloric to 2.5 parts of sulfuric) is passed through the resin bed at a flow rate of 10 ml./min. Next 700 ml. of distilled water is passed through the tube. The effluent is collected and mixed and an aliquot is titrated to determine the residual acid. From this, the total amount of acid absorbed may be computed in terms of kgr./cu. ft. of calcium carbonate which gives the total or ultimate capacity of the resin.

As has been stated earlier in this specification, reactants other than those utilized in the specific examples above may be used and in which case, other quaternary ammonium derivatives of the copolymers may be prepared in accordance with the scope of the invention. Thus, other crosslinkers, vinyl substituted cyclic compounds having an active hydrogen substituent, lower aldehydes, primary and secondary amines as well as ammonia, and quaternizing agents may be used.

It is desirable that for use as anion exchange resins, the quaternary ammonium derivatives of the copolymers of the invention be converted to the corresponding quaternary ammonium hydroxide derivatives. This result is accomplished by passing a dilute aqueous solution of an alkali, such as sodium hydroxide, over the quaternary ammonium derivative of the copolymer.

The terms and expressions which I have employed are used as terms of description and not of limitation, and I have no intention, in the use of such terms and expressions, of excluding any equivalents of the features

What is claimed is:

1. A highly basic anion exchange resin comprising a copolymer of about 60% to 99.9% on a molar basis of a vinyl methyl pyridine and about 40% to 0.1% on a molar basis of a crosslinker compound selected from the class consisting of polymerizable polyvinyl aromatic and polyvinyl aliphatic compounds; said vinyl methyl pyridine moiety having the methyl group in a position selected from the group consisting of the 2, 4 and 6 positions with respect to the nitrogen of the pyridine ring; said copolymer having quaternary ammonium methyl groups attached to the methyl groups on the pyridine nuclei to constitute quaternary ammonium ethyl groups attached to the pyridine nuclei; the ring nitrogen atoms of the pyridine being quaternized; the quaternizing substituent groups of each of the quaternary ammonium groups being a member selected from the class consisting of alkyl, aralkyl and alkanol groups; said quaternary ammonium groups being neutralized by anions.

2. A highly basic anion exchange resin comprising a copolymer of about 60% to 99.9% on a molar basis of a vinyl methyl pyridine and about 40% to 0.1% on a molar basis of a crosslinker compound selected from the class consisting of polymerizable polyvinyl aromatic and polyvinyl aliphatic compounds; said vinyl methyl pyridine moiety having the methyl group in a position alpha to the nitrogen of the pyridine ring; said copolymer having quaternary ammonium methyl groups attached to the methyl groups on the pyridine nuclei to constitute quaternary ammonium ethyl groups attached to the pyridine nuclei in a position alpha to the nitrogen of the pyridine ring; the ring nitrogen atoms of the pyridine being quaternized; the quaterizing substituent groups of each of the quaternary ammonium groups being a member selected from the class consisting of alkyl, aralkyl and alkanol groups; said quaternary ammonium groups being neutralized by anions.

3. A highly basic anion exchange resin as defined by claim 2, wherein the vinyl methyl pyridine moiety is 5-vinyl-2-methyl pyridine.

4. A highly basic anion exchange resin as defined by claim 2, wherein the crosslinking compound is divinyl benzene.

5. A highly basic anion exchange resin as defined by claim 2, wherein the crosslinking compound is divinyl ketone.

6. A highly basic anion exchange resin as defined by claim 2, wherein the crosslinking compound is a vinyl ester of a dibasic acid.

7. A highly basic anion exchange resin as defined by claim 2, wherein the crosslinking compound is an acrylic diester of an aliphatic polyhydric alcohol.

8. A highly basic anion exchange resin as defined by claim 2, wherein the crosslinking compound is the vinyl ester of methacrylic acid.

9. A highly basic anion exchange resin comprising a copolymer of about 85% to 95% by weight of 5-vinyl-2-methyl pyridine and about 15% to 5% by weight of divinyl benzene; said copolymer having quaternary ammonium methyl groups attached to the methyl groups on the pyridine nuclei to constitute quaternary ammonium ethyl groups attached to the pyridine nuclei in a position alpha to the nitrogen of the pyridine ring; the ring nitrogen atoms of the pyridine being quaternized; the quaternizing substituent groups of each of the quaternary ammonium groups being a member selected from the class consisting of alkyl, aralkyl and alkanol groups; said quarternary ammonium groups being neutralized by anions.

10. A highly basic anion exchange resin comprising a copolymer of about 85% to 95% by weight of 5-vinyl-2-methyl pyridine and about 15% to 5% by weight of divinyl benzene; said copolymer having dimethylethanolammonium methyl halide groups attached to the methyl groups on the pyridine nuclei to constitute dimethylethanolammonuim ethyl halide groups attached to the pyridine ring in a position alpha to the nitrogen of the pyridine ring; said copolymer having the ring nitrogen atoms of the pyridine rings quaternized with an alkyl halide; said quaternary ammonium groups being neutralized by anions.

11. A highly basic anion exchange resin comprising a copolymer of about 85% to 95% by weight of 5-vinyl-2-methyl pyridine and about 15% to 5% by weight of divinyl benzene; said copolymer having trimethylammonium methyl halide groups attached to the methyl groups on the pyridine nuclei to constitute trimethylammonium ethyl halide groups attached to the pyridine ring in a position alpha to the nitrogen of the pyridine ring; said copolymer having the ring nitrogen atoms of the pyridine rings quaternized with an alkyl halide; said quaternary ammonium groups being neutralized by anions.

12. A process for preparing a highly basic anion exchange resin comprising a copolymer of about 60% to 99.9% on a molar basis of a vinyl methyl pyridine and about 40% to 0.1% on a molar basis of a crosslinker compound selected from the class consisting of polymerizable polyvinyl aromatic and aliphatic compounds; said vinyl methyl pyridine moiety having the methyl group in a position selected from the group consisting of the 2, 4 and 6 positions with respect to the nitrogen of the pyridine ring; said copolymer having quaternary ammonium methyl groups attached to the methyl groups on the pyridine nuclei to constitute quaternary ammonium ethyl groups attached to the pyridine nuclei; the ring nitrogen atoms of the pyridine being quaternized; the quaternizing substituent groups of each of the quaternary ammonium groups being a member selected from the class consisting of alkyl, aralkyl and alkanol groups; said quaternary ammonium groups being neutralized by anions, which process comprises condensing said copolymer with an aldehyde containing not more than 3 carbon atoms and a compound selected from the class consisting of ammonia, primary and secondary aliphatic amines, and quaternizing the anion groups with a quaternizing agent capable of introducing groups selected from the class consisting of alkyl, aralkyl and alkanol groups.

13. A process for preparing a highly basic anion exchange resin comprising a copolymer of about 60% to 99.9% on a molar basis of a vinyl methyl pyridine and about 40% to 0.1% on a molar basis of a crosslinker compound selected from the class consisting of polymerizable polyvinyl aromatic and polyvinyl aliphatic compounds; said vinyl methyl pyridine moiety having the methyl group in a position alpha to the nitrogen of the pyridine ring; said copolymer having quaternary ammonium methyl groups attached to the methyl groups on the pyridine nuclei to constitute quaternary ammonium ethyl groups attached to the pyridine nuclei in a position alpha to the nirtogen of the pyridine ring; the ring nitrogen atoms of the pyridine being quaternized; the quaternizing substituent groups of each of the quaternary ammonium groups being a member selected from the class consisting of alkyl, aralkyl and alkanol groups; said quaternary ammonium groups being neutralized by anions, which process comprises condensing said copolymer with an aldehyde containing not more than 3 carbon atoms and a compound selected from the class consisting of ammonia, primary and secondary aliphatic amines, and quaternizing the amino groups with a quaternizing agent capable of introducing groups selected from the class consisting of alkyl, aralkyl and alkanol groups.

14. A process as defined by claim 13 wherein the vinyl, methyl pyridine moiety is 5-vinyl-2-methyl pyridine.

15. A process as defined by claim 13 wherein the aldehyde is formaldehyde.

16. A process of producing a highly basic anion exchange resin comprising a copolymer of about 85% to 95% by weight of 5-vinyl-2-methyl pyridine and about 15% to 5% by weight of divinyl benzene; said copolymer having dimethylethanolammonium methyl halide groups attached to the methyl groups on the pyridine nuclei to constitute dimethylethanolammonium ethyl halide groups attached to the pyridine ring in a position alpha to the nitrogen of the pyridine ring; said copolymer having the ring nitrogen atoms of the pyridine rings quaternized with an alkyl halide, which process comprises condensing said copolymer with formaldehyde and methyl ethanolamine and quaternizing the amino groups with an alkyl halide.

17. The process of removing anions from an aqueous solution which comprises contacting such solution with a highly basic anion exchange resin which is substantially insoluble in water, dilute acids and alkalies, said anion exchange resin being one as defined by claim 1.

References Cited in the file of this patent
UNITED STATES PATENTS

| | | |
|---|---|---|
| 2,540,984 | Jackson | Feb. 6, 1951 |
| 2,540,985 | Jackson | Feb. 6, 1951 |
| 2,578,938 | Kunin | Dec. 18, 1951 |
| 2,591,573 | McBurney | Apr. 1, 1952 |
| 2,597,494 | Hwa | May 20, 1952 |
| 2,611,768 | Butler | Sept. 23, 1952 |
| 2,614,099 | Bauman | Oct. 14, 1952 |
| 2,632,001 | McMaster et al. | Mar. 17, 1953 |
| 2,687,382 | Butler et al. | Aug. 24, 1954 |
| 2,743,294 | Fakstorp | Apr. 24, 1956 |
| 2,759,020 | Girod | Aug. 14, 1956 |

UNITED STATES PATENT OFFICE

CERTIFICATE OF CORRECTION

Patent No. 2,801,224                                          July 30, 1957

Albert H. Greer

It is hereby certified that error appears in the printed specification of the above numbered patent requiring correction and that the said Letters Patent should read as corrected below.

Column 3, line 7, right-hand portion of the formula, for "$X_1X_2-$" read -- $X_1X_2^=$ --; column 4, line 65, for "amine" read -- amines --; column 7, line 19, before "stirring" insert -- with --; column 10, line 43, for "anion" read -- amino --.

Signed and sealed this 26th day of November 1957.

(SEAL)
Attest:

KARL H. AXLINE
Attesting Officer

ROBERT C. WATSON
                                                                     Commissioner of Patents